United States Patent
Carlos

(10) Patent No.: US 9,712,682 B2
(45) Date of Patent: Jul. 18, 2017

(54) METHOD AND SYSTEMS FOR AUTOMATICALLY ASSIGNING VIRTUAL NUMBERS

(71) Applicant: Vonage America Inc., Holmdel, NJ (US)

(72) Inventor: Zenon Carlos, Pacifica, CA (US)

(73) Assignee: Vonage America Inc., Holmdel, NJ (US)

(*) Notice: Subject to any disclaimer, the term of this patent is extended or adjusted under 35 U.S.C. 154(b) by 103 days.

(21) Appl. No.: 14/491,253

(22) Filed: Sep. 19, 2014

(65) Prior Publication Data

US 2016/0088162 A1 Mar. 24, 2016

(51) Int. Cl.
*H04M 7/00* (2006.01)
*H04M 3/42* (2006.01)

(52) U.S. Cl.
CPC ..... *H04M 7/0075* (2013.01); *H04M 3/42187* (2013.01); *H04M 3/42102* (2013.01); *H04M 7/009* (2013.01); *H04M 7/0057* (2013.01); *H04M 2201/12* (2013.01); *H04M 2201/18* (2013.01)

(58) Field of Classification Search
CPC ............. H04M 7/0075; H04M 7/0057; H04M 3/4228; H04M 7/006; H04M 7/009; H04M 3/42042; H04M 15/49; H04M 15/55; H04L 29/06; H04L 67/14; H04L 67/303

See application file for complete search history.

(56) References Cited

U.S. PATENT DOCUMENTS

| | | | | |
|---|---|---|---|---|
| 6,327,353 B1* | 12/2001 | Fukuzawa | ............... | H04M 3/22 379/201.01 |
| 7,346,156 B1 | 3/2008 | Choupak et al. | | |
| 7,386,111 B2 | 6/2008 | Holder | | |
| 7,680,262 B2* | 3/2010 | Holder | .................. | H04M 7/122 370/352 |
| 8,064,582 B2* | 11/2011 | Ma | ........................ | H04M 15/06 379/142.06 |
| 8,150,400 B1* | 4/2012 | Jordan, Jr. | ............ | H04W 48/17 455/405 |
| 8,190,196 B2* | 5/2012 | Billmaier | ................ | H04W 8/26 370/395.2 |
| 8,213,594 B2 | 7/2012 | Holder | | |
| 8,295,270 B2* | 10/2012 | Takken | ................... | H04L 29/06 370/352 |
| 8,306,201 B1* | 11/2012 | Borislow | .......... | H04M 3/42059 379/142.01 |

(Continued)

*Primary Examiner* — Brian O'Connor
(74) *Attorney, Agent, or Firm* — Moser Taboada; Joseph Pagnotta

(57) ABSTRACT

Methods and systems for automatically assigning virtual numbers are provided herein. In some embodiments, a method for automatically assigning virtual numbers may include receiving, from a first customer device associated with a first identifier, a second identifier associated with a recipient device; establishing a call between the first customer device and the recipient device; assigning a first virtual number associated with the first identifier and the second identifier, wherein the first virtual number is selected to be in a local calling area of the first identifier; and transmitting the first virtual number to the customer for use in making future calls to the recipient device.

26 Claims, 5 Drawing Sheets

(56) References Cited

U.S. PATENT DOCUMENTS

| | | | | |
|---|---|---|---|---|
| 8,571,533 B2* | 10/2013 | Jiang | ........................ | H04W 8/12 |
| | | | | 455/415 |
| 8,588,387 B2* | 11/2013 | Ma | ........................ | H04M 15/06 |
| | | | | 379/142.04 |
| 8,774,384 B2* | 7/2014 | McDonald, Sr. | . | H04L 29/12103 |
| | | | | 379/202.01 |
| 8,798,258 B1* | 8/2014 | Croak | ................ | H04M 3/42042 |
| | | | | 379/207.14 |
| 8,824,652 B2* | 9/2014 | Bennett | ................... | H04L 63/30 |
| | | | | 379/133 |
| 8,867,716 B2* | 10/2014 | Borislow | .......... | H04M 3/42059 |
| | | | | 379/142.01 |
| 9,026,084 B2* | 5/2015 | Szesztay | ............ | H04M 3/42008 |
| | | | | 379/142.02 |
| 9,270,814 B2* | 2/2016 | Bennett | .............. | H04M 3/42042 |
| 9,332,408 B2* | 5/2016 | Lowman | ................ | H04M 7/127 |
| 9,521,112 B2* | 12/2016 | Efrati | ................... | H04L 61/605 |
| 2002/0061100 A1 | 5/2002 | DiCamillo et al. | | |
| 2008/0112552 A1* | 5/2008 | Urban | ................... | H04M 1/575 |
| | | | | 379/142.04 |
| 2012/0135722 A1* | 5/2012 | Jiang | ........................ | H04W 8/12 |
| | | | | 455/415 |
| 2014/0057612 A1* | 2/2014 | Du Bourg De Luzencon | ................ | H04M 1/57 |
| | | | | 455/415 |
| 2014/0161242 A1* | 6/2014 | Reiher | ............. | H04M 1/274566 |
| | | | | 379/201.01 |
| 2015/0030145 A1* | 1/2015 | Balan | ................ | H04M 3/42042 |
| | | | | 379/142.06 |

* cited by examiner

METHOD AND SYSTEMS FOR AUTOMATICALLY ASSIGNING VIRTUAL NUMBERS

BACKGROUND

Field

Embodiments of the present invention generally relate to long distance phone calls and, more specifically, to a method and apparatus for automatically assigning virtual numbers for international dialing in a telecommunication system.

Description of the Related Art

Voice over IP (VoIP) is a technological development in the field of telecommunications that is utilized to transmit voice conversations over a data network using the Internet Protocol (IP). After a user subscribes to a VoIP service, the user can make phone calls to other VoIP subscribers or to public switched telephone network (PSTN) customers and access a number of features associated with the VoIP service, such as call waiting, three-way calling, call forwarding, voicemail service, and the like.

Telecommunication systems, including VoIP systems, typically distinguish between local telephone calls and long distance telephone calls. A long distance telephone call is one made outside of a defined area, such as outside a particular U.S. area code or an international call. In terms of dialing, local phone numbers are shorter than international phone numbers. For example, according to the North American Numbering Plan (NANP), a long distance telephone number includes a one-digit country calling code, a three-digit area code, a three-digit exchange code, and a four-digit number for a total of 11 digits. An international long distance telephone number includes more than 11 digits, including an international access code (e.g., 011), a country code, and up to 13 additional digits. Dialing these many digits can be cumbersome and some contact or phone book applications associated with a user device may be ill-suited to accept international phone numbers.

Typically, the same service provider will serve all outgoing telephone calls, both local and long distance. Hence, a subscriber of a telephone service has little choice for long distance service other than that provided by the service provider.

Generally, when placing international calls, one or both parties could be charged excessive communication fees based on long distance carrier rates, roaming charges and the like. Similarly, if the called party desires to call back the subscriber, this operation would most likely be carried out based on the telephone number provided in, for example, the caller ID information. Such caller ID information would inconveniently result in a long distance call on the return path.

The local and long distance companies incur costs for the equipment, switching calls, and maintaining their equipment. All of these costs are eventually passed on to the consumer. Because local calls involve one or two switching stations owned by one company, the costs of a local telephone call are typically low. Typically, a consumer pays a fixed fee for an unlimited amount of local calls. However, because long distance calls are transferred from a local telephone company, to a long distance carrier, and then back to another local telephone company, the cost of a long distance call is greater than a local call. Typically, long distance calls are charged by the minute. However, rates vary depending on a number of factors, such as the number of switches between the originating and destination numbers and taxes. For example, long distance calls between countries may be higher than long distance calls within a given country.

Currently, telephone calling card processing services provide a customer with an access number to call when making international calls, such that using the access number routes call in a way that lower costs for international long distance calls. For example, a customer may receive a telephone card that authorizes telephone call charges to be charged to the customer's account. Typically, the user has to dial a number associated with the calling card processing service and is prompted to dial-in an account number and a personal identification number (PIN) for authentication and authorization purposes. Once the authorization and authentication step is complete, the caller is prompted to dial the called party's telephone number and charges for the call are charged to the customer's account.

Virtual numbers can be used to provide a customer with a lower cost option for making international calls. A virtual number is a telephone number in a service area that is local to the customer, but when dialed, redirects the call to an international telephone number. Hence, the customer is charged for making a call within the customer's local calling area, rather than an international call. Currently, providing virtual numbers for international calls is a manual process where a user calls the calling card processing server and is assigned a virtual number. In addition, there is no process for obtaining a virtual number for a recipient to use when calling back the customer.

Thus, there is a need for an improved method and system for automatically assigning virtual numbers for international dialing in a telecommunication system.

SUMMARY

Methods and systems for automatically assigning virtual numbers are provided herein. In some embodiments, a method for automatically assigning virtual numbers may include receiving, from a first customer device associated with a first identifier, a second identifier associated with a recipient device; establishing a call between the first customer device and the recipient device; assigning a first virtual number associated with the first identifier and the second identifier, wherein the first virtual number is selected to be in a local calling area of the first identifier; and transmitting the first virtual number to the customer for use in making future calls to the recipient device.

In some embodiments, a method for automatically assigning virtual numbers may include sending, from a first customer device associated with a first identifier, a request to establish a first call to a pre-paid calling service, providing, to the pre-paid calling service, a second identifier to establish a second call between the first customer device and a recipient device associated with the second identifier, receiving an indication that the second call with the recipient device has been established, and receiving, from the pre-paid calling service, a first virtual number to be used in establishing a call with the recipient device, wherein the virtual number is in a local calling area as the first identifier.

In some embodiments, an apparatus for automatically assigning virtual numbers may include a communication module configured to receive, from a first customer device associated with a first identifier, a second identifier associated with a recipient device; and establish a call between the first customer device and the recipient device; and a virtual number assignment module configured to assign a first virtual number associated with the first identifier and the second identifier, wherein the first virtual number is selected to be in a local calling area of the first identifier; and transmit the first virtual number to the customer for use in making future calls to the recipient device.

In some embodiments, a computer readable medium is disclosed. The computer readable medium stores computer instructions that, when executed by at least one processor causes the at least one processor to perform the method for automatically assigning virtual numbers.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
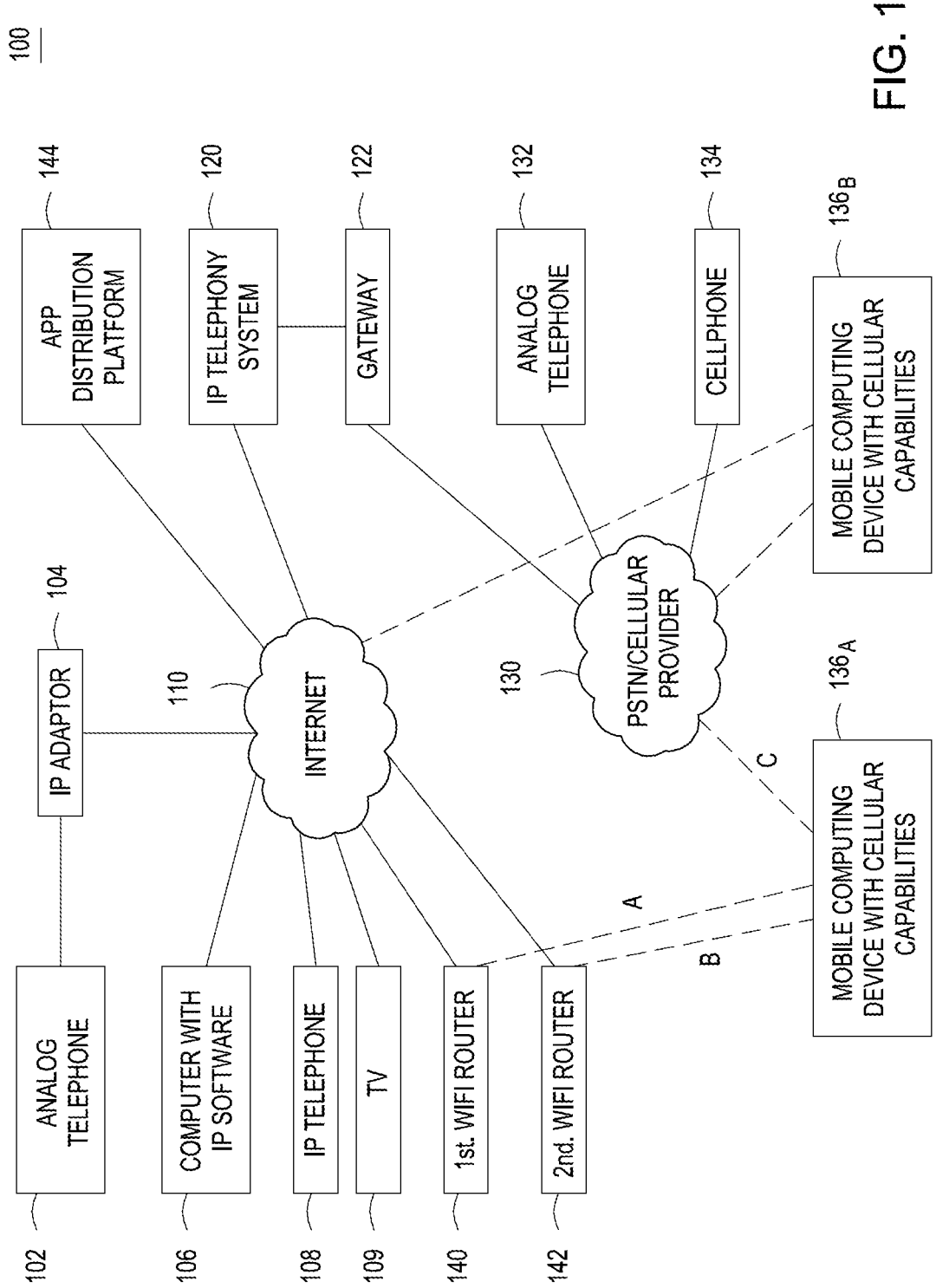
FIG. 1 depicts a block diagram of a telecommunication network, according to one or more embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to methods and systems for automatically assigning virtual numbers for international dialing in a telecommunication system. The present disclosure includes exemplary embodiments of methods performed by a pre-paid calling card processing service. However, it is appreciated by those in the art that embodiments of the present invention may be used to assign virtual numbers without a pre-paid calling card processing service, but rather through a virtual number assignment service provided by, for example, a VoIP service provider.

When a prepaid international calling service is utilized for calling internationally, a customer creates an account with the service and is validated/authorized to use the international calling service. For example, a customer may receive a telephone card that authorizes telephone call charges to be charged to the customer's account. Typically, the user dials a general access number associated with the calling card processing service and is prompted to dial-in an account number and a personal identification number (PIN) for authentication and authorization purposes. The general access number is a telephone number that may be used by a plurality of different customers to access the prepaid international calling service. Once the authorization and authentication step is complete, the caller is prompted to dial the called party's (i.e., recipient's) telephone number and charges for the call are charged to the customer's account. Alternatively, the customer may setup their account online with the international calling service and authenticate the customer using the customer's telephone number.

Once validated, the caller may dial the general access number associated with the calling card processing service and is prompted to dial the called party's (i.e., recipient's) telephone number. The calling card processing service uses the caller identifier of the incoming call from the customer to identify the customer and access the customer's account.

The prepaid international calling service tracks a number of calls made by the customer to a specific telephone number. In some embodiments, the service provider specifically tracks international calls made by the customer. The customer calls a recipient at a given international number. The prepaid calling server determines whether the number of times that a customer calls the recipient at the specific telephone number exceeds a predefined threshold, for example, three times within a thirty day period. When the predefined threshold is exceeded, the prepaid international calling service automatically assigns a virtual number to the customer. The virtual number is a telephone number that is local to the customer that may be used to call the recipient. A telephone number is "local" if the telephone number in is in a calling area where use of the local telephone number incurs little or no charges to the customer. When the customer places a call to the virtual number, the international calling service determines the actual international number to which the virtual number is assigned, and routes the call to the international number. In some embodiments, the international calling service also assigns a virtual number that is local to the recipient. The virtual number that is local to the recipient may be used by the recipient to call back the customer. In some embodiments, the virtual number that is local to the recipient is transmitted to the customer. In some embodiments, the virtual number that is local to the recipient is also transmitted to the recipient. Thus, the virtual numbers are automatically assigned when a recipient is called with a pre-defined frequency. Methods for routing a long distance call based on a virtual phone number are disclosed in U.S. Pat. No. 8,213,594, issued on Jul. 3, 2012 and titled "Method and Apparatus for Placing a Long Distance Call Based on a Virtual Phone Number", which is herein incorporated by reference in its entirety.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a WiFi or WiMax router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the WIMAX standard.

Similarly, mobile computing device with cellular capabilities 136B may also be coupled to internet 110 and/or cellular service provider 130. In some embodiments, mobile computing device 136B may be connected to internet 110 via a WiFi or WIMAX connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

In some systems and methods embodying the invention, telephony communications are effected over a packet-based data network. Signaling that is conducted in the packet-based data network is executed using Session Initiation Protocol (SIP). SIP is a popular communication protocol for initiating, managing and terminating media (e.g., voice, data and video) sessions across packet-based data networks that typically use the Internet Protocol (IP), of which Voice Over Internet Protocol (VOIP) is an example. The details and functionality of SIP can be found in the Internet Engineering Task Force (IETF) Request for Comments (RFC) Paper No. 3261 entitled, "SIP: Session Initiation Protocol" herein incorporated in its entirety by reference.

SIP establishes and negotiates a session, including the modification or termination of a session. It uses a location-independent address system feature in which called parties can be reached based on a party's name. SIP supports name mapping and redirection, allowing users to initiate and receive communications from any location. Of course, while SIP is a preferred protocol for establishing communications over a data network, other signaling protocols could also be used to perform the invention.

Figure 2:
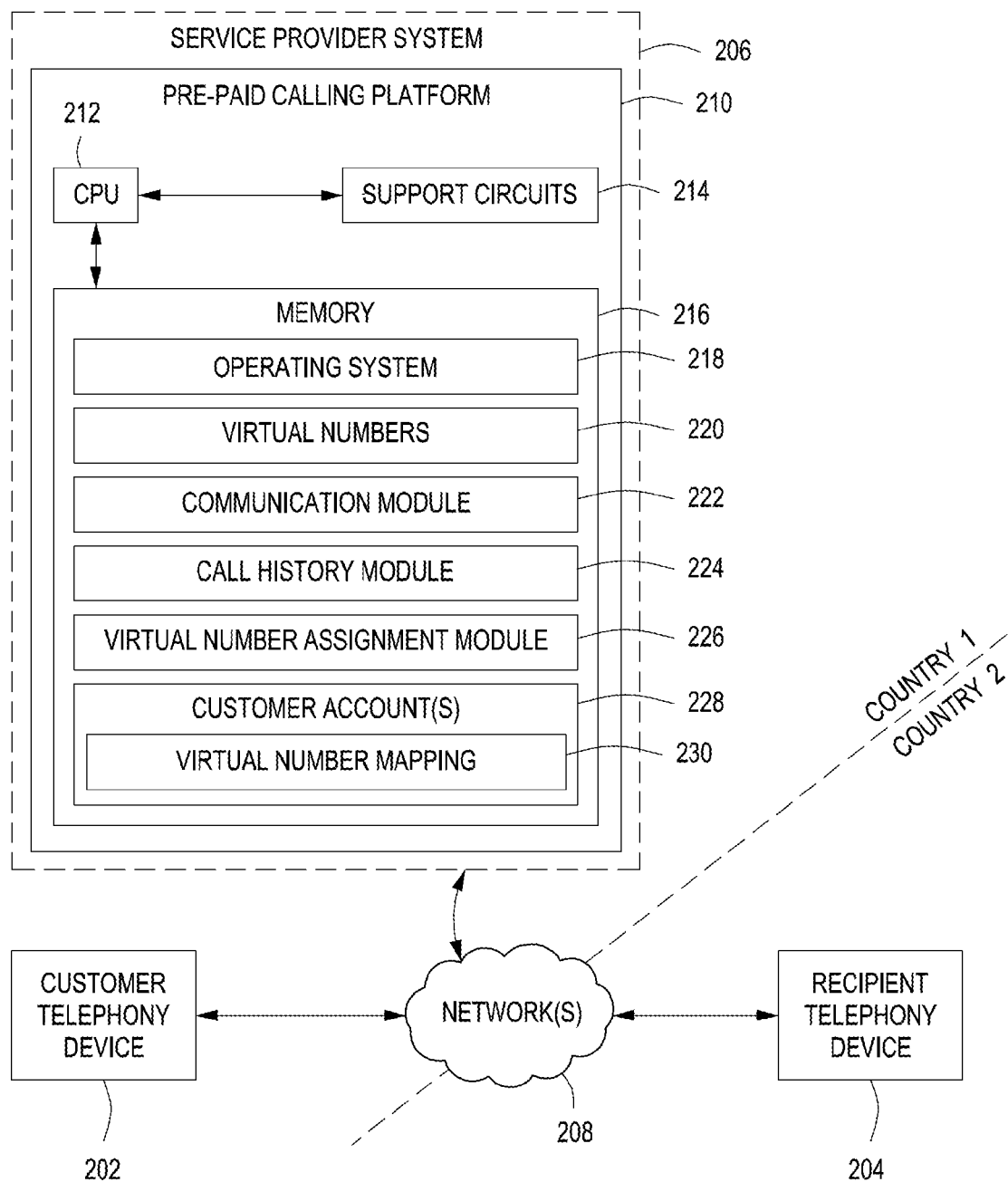
FIG. 2 depicts a block diagram of a system for automatically assigning virtual numbers, according to one or more embodiments of the invention.

FIG. 2 depicts a block diagram of a system 200 for automatically assigning virtual numbers, according to one or more embodiments of the invention. The system 200 comprises a customer telephony device 202 depicted in Country 1, a recipient telephony device in Country 2, and a service provider system 206 communicatively coupled via networks 208. In some embodiments, the customer telephony device 202 may be a mobile computing device (e.g., 136A) associated with a customer, and service provider system 206 may be IP telephony system 120 as described above in FIG. 1. The customer telephony device 202 in Country 1 may be used to place a call to recipient telephony device 204 in Country 2. Although embodiments of the present invention are described herein with respect to international calling being two different countries, those skilled in the art will appreciate that embodiments of the invention may be used to reduce costs associated with calling different regions within the same country (e.g., for calls between two different area codes that may incur calling charges).

In some embodiments, service provider system 206 may be a communication service provider, such as a VoIP service provider, that includes and maintains a pre-paid calling platform 210. In other embodiments, pre-paid calling platform 210 may be a separate entity that provides international calling card services to service provider system 206, or to individual users, by agreement. Service provider system 206 may include pre-paid calling platform 210 that may be used to provide pre-paid international calling card processing services to customers of the calling card processing services, such as routing calls, assigning virtual numbers, and maintaining customer balances associated with the pre-paid international calling. The pre-paid calling platform 210 may include a Central Processing Unit (CPU) 212, support circuits 214, and memory 216. The CPU 212 may comprise one or more commercially available microprocessors or microcontrollers that facilitate data processing and storage. The various support circuits 214 facilitate the operation of the CPU 212 and include one or more clock circuits, power supplies, cache, input/output circuits, and the like. The memory 216 comprises at least one of Read Only Memory (ROM), Random Access Memory (RAM), disk drive storage, optical storage, removable storage and/or the like. In some embodiments, the memory 216 comprises an operating system 218, virtual numbers database 220, a communication module 222, a call history module 224, a virtual number assignment module 226, and a plurality of customer accounts in a customer accounts database 228. Each customer account in the customer accounts database 228 includes a virtual number mapping 230 for the customer's frequently called international numbers. The operating system (OS) 218 generally manages various computer resources (e.g., network resources, file processors, and/or the like). The operating system 218 is configured to execute operations on one or more hardware and/or software modules, such as Network Interface Cards (NICs), hard disks, virtualization layers, firewalls and/or the like. Examples of the operating system 218 may include, but are not limited to, various versions of LINUX, MAC OSX, BSD, UNIX, MICROSOFT WINDOWS, 10S, ANDROID and the like.

The networks 208 comprise one or more communication systems that connect computers by wire, cable, fiber optic and/or wireless link facilitated by various types of well-known network elements, such as hubs, switches, routers, and the like. The networks 208 may include an Internet Protocol (IP) network (such as internet 110 of FIG. 1), a public switched telephone network (PSTN) (such as the PSTN network of PSTN provider 130 of FIG. 1), or other mobile communication networks, and may employ various well-known protocols to communicate information amongst the network resources.

In some embodiments, a customer account in the customer accounts database 228 may store a customer account number, which may be the customer's primary telephone number or cell phone number, a balance on the customer's pre-paid calling card service, an accounting of the customer's calling history, and any additional customer information that may be needed to provide the customer with the pre-paid calling card service. The virtual number mapping 230 includes a mapping of each of the customer's assigned virtual numbers to the international phone number of a frequently-called recipient. The virtual number mapping 230 may also include a mapping of the virtual number assigned to the frequently-called recipient to the customer's account number that may be used by the recipient to call back the customer. Each customer is allowed a predefined number of virtual numbers for contacting international recipients, for example, five virtual numbers.

When a customer uses the pre-paid calling card service, the customer dials a general calling card access number. The pre-paid calling card service uses the caller identifier (i.e., callerID) from the incoming call to verify that the caller is a customer. The callerID should match a customer account in the customer accounts database 228. If so, the customer is prompted to enter the telephone number of a recipient that the customer would like to call. The communication module 222 connects the call between the customer and the recipient. The call history module 224 records the call by entering the telephone number of the recipient and a date stamp in a call history in the customer account in the customer accounts database 228. In some embodiments, the call history module 224 determines if a number of times that the customer called the recipient at said telephone number meets or exceeds a predefined threshold, for example, three calls within a thirty day period. In some embodiments, no threshold needs to be met and a virtual number is assigned on the first call. The virtual number assignment module 226 determines whether the customer has exceeded the predefined number of virtual numbers allowed to be stored with the customer's account. For example, the pre-paid calling card service may allow each customer to store up to five (5) virtual numbers for five different contacts. If the customer has not exceeded the number of virtual numbers allowed, the virtual number assignment module 226 selects a virtual number from the pool of virtual numbers in the virtual numbers database 220.

The virtual number assignment module 226 identifies the customer's telephone number and selects a virtual number that is local to the customer. For example, if the customer's telephone number has a 732 area code, the virtual number assignment module 226 selects a virtual number from the pool of virtual numbers in the virtual numbers database 220 that has a 732 area code. The virtual number assignment module 226 stores the virtual number in the virtual number mapping 230 in the customer account of the customer account database 228. The pairing of the callerID of the customer and the assigned virtual number uniquely identifies the recipient's telephone number. As such, each virtual number may be assigned to a number of different customers, with each customer identifier/virtual number pair identifying a unique recipient telephone number.

In some embodiments, the virtual number assignment module 226 selects a virtual number from the pool of virtual numbers in the virtual numbers database 220 that is local to the recipient. The virtual number that is local to the recipient may be used by the recipient to call back the customer. Similarly, the pairing of the callerID of the recipient, in addition to the virtual number, uniquely identifies the customer. After the call between the customer and the recipient has ended, the virtual number assignment module 226 transmits the virtual numbers to the customer. In some embodiments, the virtual number assignment module 226 also transmits the virtual number local to the recipient directly to the recipient.

When the customer wishes to call the recipient at a later time, the customer need not call the calling card access number. Rather, the customer may place the call directly to the local virtual number associated with the recipient. The local virtual number is directed to the pre-paid calling platform 210. The communication module 222 identifies the callerID of the customer to access the virtual number mapping 230 in the customer account of the customer account database 228. The callerID of the customer plus the virtual number uniquely identifies the international telephone number of the recipient associated with the virtual number, and routes the call to the recipient. Similarly, when the recipient wishes to call the customer, the recipient directly dials the virtual number of the customer, which is directed to the pre-paid calling platform. The communication module 222 accesses the virtual number mapping 230, identifies the phone number of the customer associated with the virtual number, and routes the call to the customer's telephony device 202.

Figure 3:
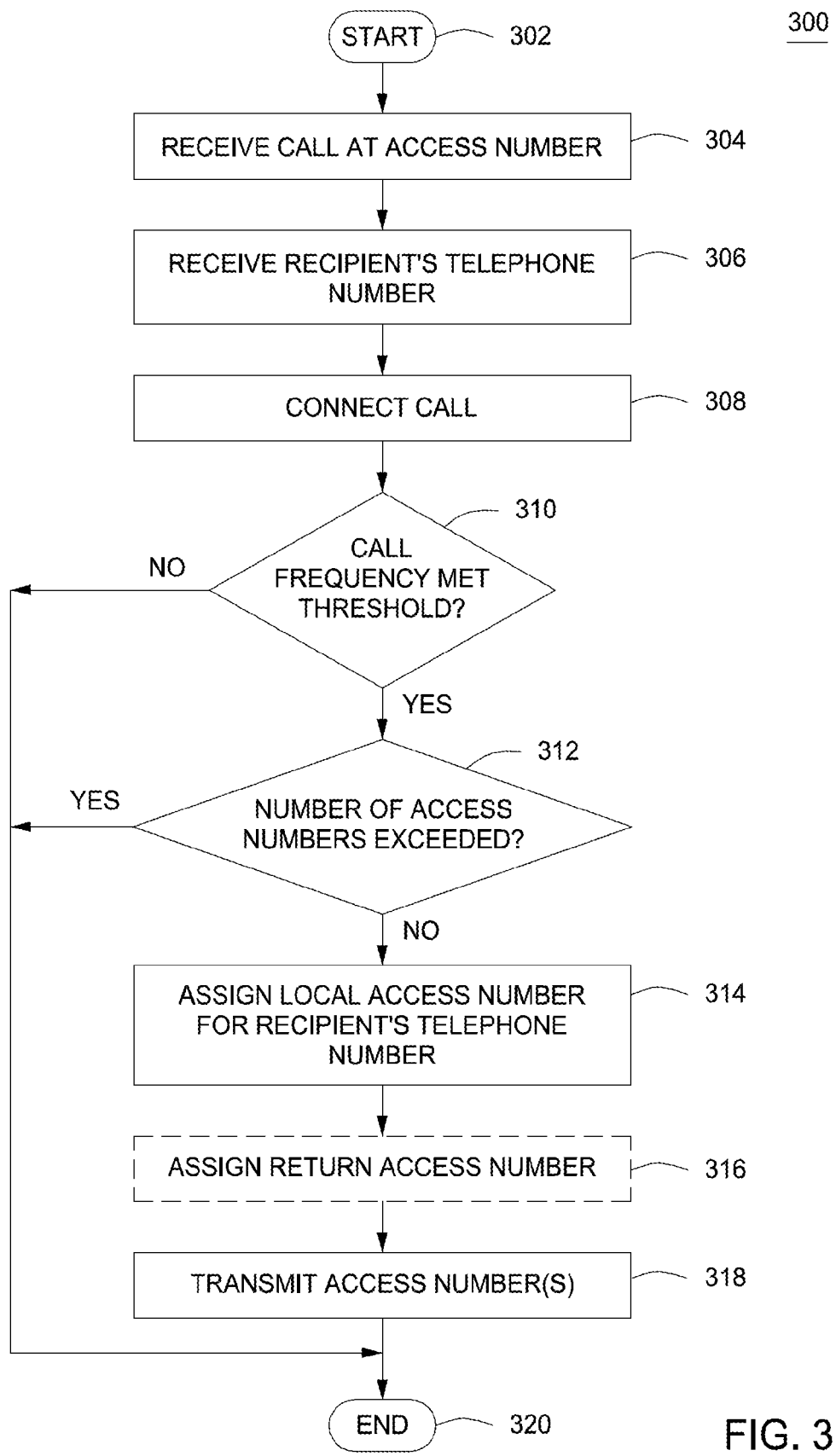
FIG. 3 depicts a flow diagram of a method for automatically assigning virtual numbers, according to one or more embodiments of the subject invention.

FIG. 3 depicts a flow diagram of a method 300 for automatically assigning virtual numbers, according to one or more embodiments of the subject invention. The method 300 starts at step 302 and proceeds to step 304. At step 304 the communication module 222 receives a call at an access number. In some embodiments, the access number is a telephone number for a pre-paid calling card service. In some embodiments, the access number is a generic telephone number assigned by a service provider, for example, a VoIP service provider.

At step 306, a recipient's telephone number is received. The recipient's telephone number may be received in response to a prompt asking for the recipient's telephone number. The recipient's telephone number may be an international long distance telephone number. An international long distance telephone number includes more than 11 digits, including an international access code (e.g., 011), a country code, and up to 13 additional digits. As an illustrative example, suppose the customer's account number is cell phone number 732-555-1234 and the customer is calling a recipient in London UK at 011 20 7946 0521.

At step 308, the communication module 222 connects the call between the customer and the recipient. In some embodiments, a call request is sent as a SIP INVITE message. The call request is acknowledged by the recipient device and the call is connected between the two parties. In some embodiments, an indication, such as an SIP OK message, is sent to the customer device to indicate that the call with the recipient device has been established.

At step 310, it is determined whether a number of times the customer has called the recipient at the recipient's telephone number exceeds a predefined threshold. The call history module 224 accesses the customer account and adds the recipient's telephone number and a time stamp of the call to a call history log. The call history module 224 then determines whether the customer has called the recipient at the received telephone number for example, three (3) or more times within a thirty (30) day period. If not, then the method 300 proceeds to step 320 and ends.

However, if at step 310, it is determined that the number of times the customer has called the recipient at the received telephone number meets or exceeds the predefined threshold, then if possible, a local virtual number should be assigned for the customer to use to call the recipient in the future.

At step 312, the virtual number assignment module 226 determines whether the customer has been assigned a maximum number of virtual numbers for use in calling international recipients. For example, each customer may be limited to five (5) virtual numbers. If the customer has been assigned the maximum number of virtual numbers, then the customer may not be assigned a virtual number for the recipient with whom the customer is currently speaking. The customer may at any time contact the pre-paid calling service and have one or more virtual numbers removed from the customer's account if, for example, the customer no longer uses one or more of the customer's assigned virtual numbers. When the customer calls the recipient again, if the number of calls made to the recipient meets or exceeds the predefined threshold, and the maximum number of virtual numbers has not been reached, a virtual number will be created. However, if the customer has been assigned the maximum number of virtual numbers, the method 300 proceeds to step 320 and ends.

If at step 312, the maximum number of assigned virtual numbers has not been met, then at step 314, the virtual number assignment module 226 assigns a local virtual number that is associated with the recipient's long distance telephone number. The local virtual number is a telephone number that may be used to call the recipient in place of the recipient's long distance telephone number.

The pre-paid calling platform has a pool of virtual numbers from which to choose. For example, there may be 100 virtual numbers with a 732 area code, 20 virtual numbers with a 609 area code, 10 virtual numbers that are local to London, UK, 15 virtual numbers that are local to Madrid, Spain, and the like. The virtual number assignment module determines the customer's telephone number from the customer's account and selects a virtual number that is local to the customer. In the present example, the virtual number assignment module recognizes the customer has a telephone number with a 732 area code and selects a local virtual number with a 732 area code, for example, 732-555-4921. The local virtual number is stored in the customer's account along with a mapping to the recipient's long distance telephone number, such that in the future, when the customer dials the local virtual number, the call can be routed to the long distance number.

At step 316, the virtual number assignment module may optionally assign a return virtual number. The return virtual number is a telephone number that is local to the recipient. In the present example, the recipient has a London UK telephone number. As such, the return virtual number may be 011 20 7946 0629. The return virtual number may be used by the recipient to call the customer. The return virtual number is stored in the customer's account such that in the future, when the recipient dials the return virtual number, the call can be routed to the customer's telephone number.

At step 318, the local virtual number and, if created, the return virtual numbers are transmitted to the customer. In some embodiments, the virtual numbers are transmitted after the call between the customer and the recipient is complete. The virtual numbers may be sent in a short message service (SMS), e-mail, or interactive voice response (IVR), or in any method specified by the customer. In some embodiments, the virtual number included in an SMS or email message sent to the customer may be selected by the customer causing the customer's device to automatically dial the virtual number. The customer may forward the return virtual number to the recipient. In some embodiments, the return virtual number is transmitted directly to the recipient. The method 300 ends at step 320.

Figure 4:
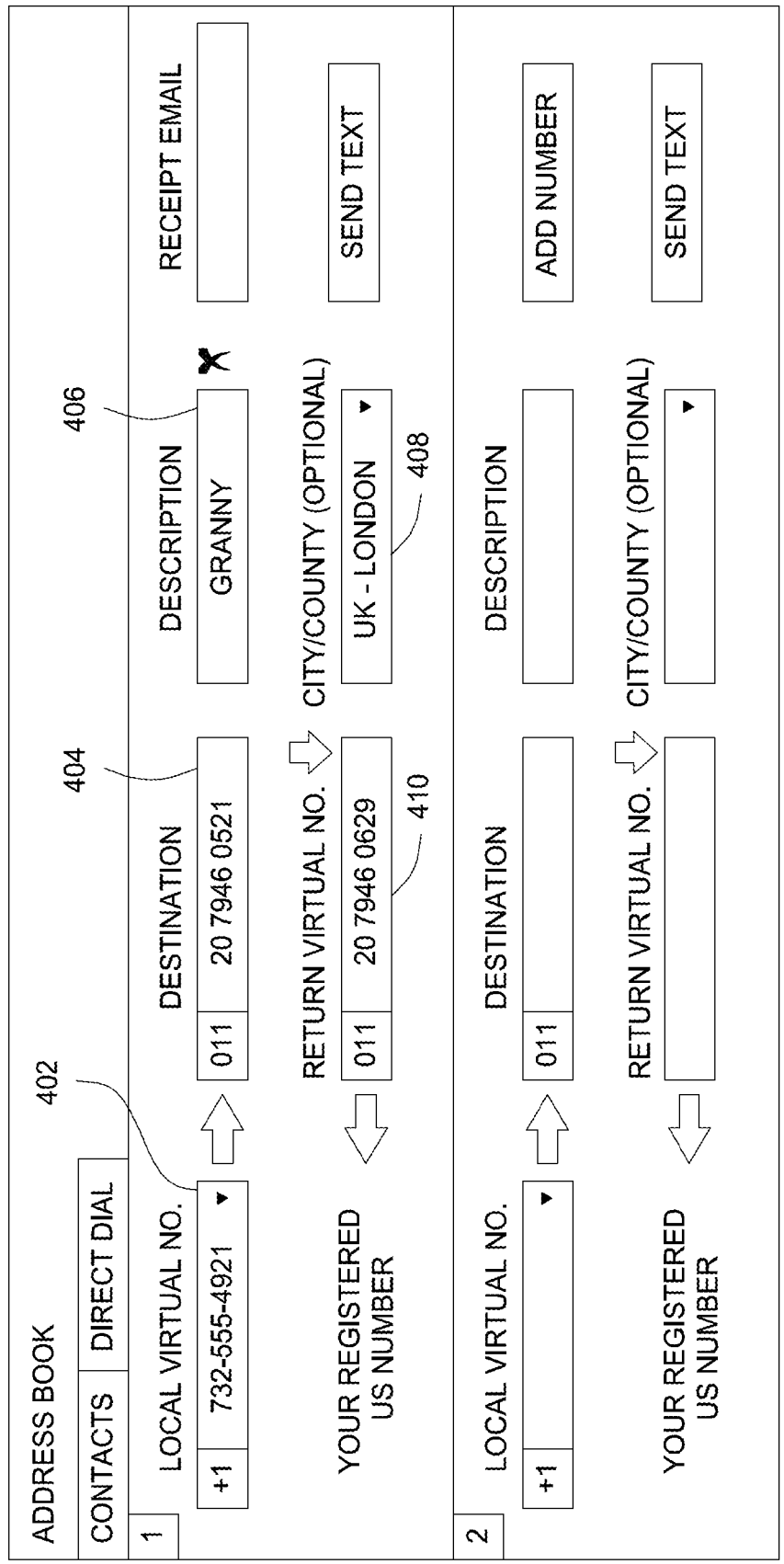
FIG. 4 depicts an screen shot that illustrates a mapping of virtual numbers to a recipient, according to one or more embodiments of the subject invention.

FIG. 4 depicts screen shot 400 that illustrates a mapping of virtual numbers to a recipient, according to one or more embodiments of the subject invention. The mapping is stored in the customer account of the customer account database 228. When a customer dials a recipient telephone number with a frequency that meets a predefined threshold, for example, three times within a three month period, a local virtual number 402 is selected by the virtual number assignment module 226. The local virtual number 402 is stored with the recipient's telephone number 404. The number may also be stored with a description 406 of the recipient, in the present example, "GRANNY". A return virtual number 410 is selected by the virtual number assignment module 226 that may be used by the recipient to call the customer. A location 408 of the recipient may also be stored with the mapping.

Once the mapping is stored in the customer account, the customer may call the local virtual number 402. When the call request is received at the pre-paid calling platform, the recipient's telephone number 404 is identified from the mapping. Although the customer dialed a local number, the call is routed to the recipient's international telephone number. Similarly, when the recipient calls the return virtual number 410, the return virtual number is mapped to the customer's telephone number. Although the recipient dialed a local number, the call is routed to the customer's telephone number.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
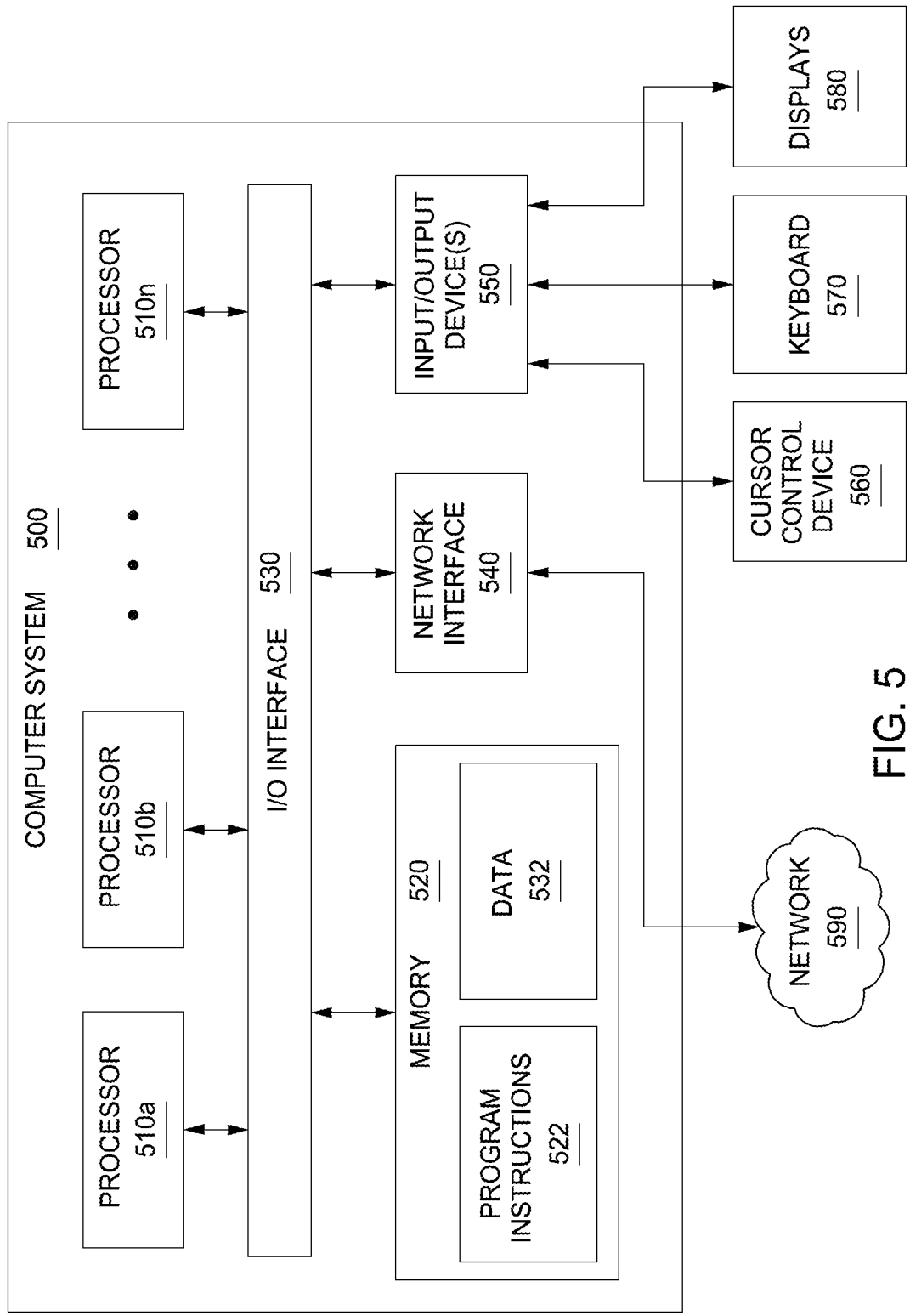
FIG. 5 depicts a computer system that can be utilized in various embodiments of the present invention, according to one or more embodiments of the invention.

FIG. 5 depicts a computer system 500 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement the method 300 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIG. 3. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for automatically assigning virtual numbers, comprising:
    receiving, from a first customer device associated with a first identifier, a second identifier associated with a recipient device;
    establishing a long distance call between the first customer device and the recipient device using the second identifier;
    assigning a first virtual number associated with the first identifier and the second identifier, wherein the first virtual number is selected to be in a local calling area of the first identifier;
    transmitting the first virtual number to a customer associated with the first customer device; and
    establishing future long distance calls to the recipient device from the first customer device using the first virtual number.

2. The method of claim 1, wherein the second identifier is an international telephone identifier associated with the recipient device.

3. The method of claim 1, wherein assigning a first virtual number occurs when a number of calls from the first identifier to the second identifier exceeds a predefined threshold.

4. The method of claim 1, further comprising storing a mapping of the first identifier and the first virtual number to the second identifier in a customer account.

5. The method of claim 1, further comprising assigning a second virtual number associated with the first identifier and the second identifier, wherein the second virtual number is selected to be in a local calling area of the second identifier.

6. The method of claim 5, further comprising transmitting the second virtual number to the customer.

7. The method of claim 5, further comprising transmitting the second virtual number to the recipient device for use in making future calls to the first customer device.

8. The method of claim 5, further comprising:
receiving a call request directed to the second virtual number;
identifying the second identifier from the call request;
mapping the second virtual number and the second identifier to the first identifier; and
connecting the long distance call between a device associated with the second identifier and a device associated with the first identifier.

9. The method of claim 1, wherein transmitting occurs after completion of the long distance call between the first customer device and the recipient device.

10. The method of claim 1, wherein the first virtual number is transmitted via at least one of short message service (SMS) or interactive voice response (IVR).

11. The method of claim 1, further comprising:
receiving a call request directed to the first virtual number;
identifying the first identifier from the call request;
mapping the first identifier and the first virtual number to the second identifier; and
connecting the long distance call between a device associated with the first identifier and a device associated with the second identifier.

12. An apparatus for automatically assigning virtual numbers, comprising:
a communication module configured to receive, from a first customer device associated with a first identifier, a second identifier associated with a recipient device, and establish a long distance call between the first customer device and the recipient device using the second identifier; and
a virtual number assignment module configured to assign a first virtual number associated with the first identifier and the second identifier, wherein the first virtual number is selected to be in a local calling area of the first identifier, and transmit the first virtual number to a customer associated with the first customer device such that future long distance calls to the recipient device from the first customer device are established using the first virtual number.

13. The apparatus of claim 12, wherein the second identifier is an international telephone identifier associated with the recipient device.

14. The apparatus of claim 12, wherein the virtual number assignment module is configured to assign a first virtual number when a number of calls from the first identifier to the second identifier exceeds a predefined threshold.

15. The apparatus of claim 12, wherein the virtual number assignment module is further configured to store a mapping of the first identifier and the first virtual number to the second identifier in a customer account.

16. The apparatus of claim 12, wherein the virtual number assignment module is further configured to assign a second virtual number associated with the first identifier and the second identifier, wherein the second virtual number is selected to be in a local calling area of the second identifier.

17. The apparatus of claim 16, wherein the virtual number assignment module is further configured to transmit the second virtual number to the customer.

18. The apparatus of claim 16, wherein the virtual number assignment module is further configured to transmit the second virtual number to the recipient device for use in making future calls to the first customer device.

19. The apparatus of claim 12, wherein transmitting occurs after completion of the long distance call between the first customer device and the recipient device.

20. The apparatus of claim 12, wherein the virtual number assignment module is further configured to transmit the first virtual number via at least one of short message service (SMS), e-mail, or interactive voice response (IVR).

21. A computer implemented method of automatically assigning virtual numbers comprising:
sending, from a first customer device associated with a first identifier, a request to establish a first call to a pre-paid calling service;
providing, to the pre-paid calling service, a second identifier to establish a second call between the first customer device and a recipient device associated with the second identifier;
receiving an indication that the second call with the recipient device has been established; and
receiving, from the pre-paid calling service, a first virtual number such that future calls to the recipient device from the first customer device are established using the first virtual number, wherein the virtual number is in a local calling area of the first identifier.

22. The method of claim 21, further comprising receiving a second virtual number selected to be in a local calling area of the second identifier.

23. The method of claim 21, wherein the second identifier is an international telephone identifier associated with the recipient device.

24. The method of claim 21, wherein the first virtual number is received via a short message service (SMS) message.

25. The method of claim 24, further comprising:
receiving an indication of a selection of the first virtual number in the SMS message; and
sending a request to establish a telecommunication connection directed towards the first virtual number.

26. A non-transitory computer readable medium for storing computer instructions that, when executed by at least one processor causes the at least one processor to perform a method for automatically assigning virtual numbers, comprising:
receiving, from a first customer device associated with a first identifier, a second identifier associated with a recipient device;
establishing a long distance call between the first customer device and the recipient device using the second identifier;
assigning a first virtual number associated with the first identifier and the second identifier, wherein the first virtual number is selected to be in a local calling area of the first identifier;

transmitting the first virtual number to a customer associated with the first customer device; and establishing future long distance calls to the recipient device from the first customer device using the first virtual number.

\* \* \* \* \*